US008175326B2

(12) United States Patent
Siegel

(10) Patent No.: US 8,175,326 B2
(45) Date of Patent: May 8, 2012

(54) AUTOMATED SCORING SYSTEM FOR ATHLETICS

(76) Inventor: Fred Siegel, Tuxedo, NY (US)

( * ) Notice: Subject to any disclaimer, the term of this patent is extended or adjusted under 35 U.S.C. 154(b) by 612 days.

(21) Appl. No.: 12/396,443

(22) Filed: Mar. 2, 2009

(65) Prior Publication Data

US 2009/0220124 A1 Sep. 3, 2009

Related U.S. Application Data

(60) Provisional application No. 61/032,512, filed on Feb. 29, 2008.

(51) Int. Cl.
*G06K 9/00* (2006.01)
(52) U.S. Cl. .................................... 382/100; 382/209
(58) Field of Classification Search .................. 382/100
See application file for complete search history.

(56) References Cited

U.S. PATENT DOCUMENTS

| | | | | |
|---|---|---|---|---|
| 4,891,748 A * | 1/1990 | Mann | ................ | 463/1 |
| 5,184,295 A * | 2/1993 | Mann | ................ | 473/221 |
| 5,625,577 A * | 4/1997 | Kunii et al. | ................ | 703/2 |
| 5,826,578 A * | 10/1998 | Curchod | ................ | 600/595 |
| 5,930,379 A * | 7/1999 | Rehg et al. | ................ | 382/107 |
| 6,236,737 B1 * | 5/2001 | Gregson et al. | ................ | 382/103 |
| 7,239,718 B2 * | 7/2007 | Park et al. | ................ | 382/103 |
| 2003/0215130 A1 * | 11/2003 | Nakamura et al. | ................ | 382/154 |
| 2004/0219498 A1 * | 11/2004 | Davidson | ................ | 434/247 |
| 2005/0196737 A1 * | 9/2005 | Mann | ................ | 434/247 |
| 2006/0018516 A1 * | 1/2006 | Masoud et al. | ................ | 382/115 |
| 2006/0055699 A1 * | 3/2006 | Perlman et al. | ................ | 345/473 |
| 2009/0220124 A1 * | 9/2009 | Siegel | ................ | 382/103 |
| 2010/0303303 A1 * | 12/2010 | Shen et al. | ................ | 382/107 |
| 2011/0044602 A1 * | 2/2011 | Lim et al. | ................ | 386/224 |
| 2011/0210970 A1 * | 9/2011 | Segawa | ................ | 345/420 |

* cited by examiner

*Primary Examiner* — Sath V Perungavoor
(74) *Attorney, Agent, or Firm* — Capitol City TechLaw PLLC

(57) ABSTRACT

Disclosed are methods and systems for utilizing motion capture techniques, for example, video based motion capture techniques, for capturing and modeling the captured 3D movement of an athlete through a defined space. The model is then compared with an intended motion pattern in order to identify deviations and/or form breaks that, in turn, may be used in combination with a scoring algorithm to quantify the athlete's execution of the intended motion pattern to produce an objective score. It is anticipated that these methods and systems will be particularly useful for training and judging in those sports that have struggled with the vagaries introduced by the subjective nature of human scoring.

10 Claims, 12 Drawing Sheets

AUTOMATED SCORING SYSTEM FOR ATHLETICS

FIELD OF ENDEAVOR

The disclosure relates to motion capture and analysis of athletes' performance for the purpose of quantifying training and/or scoring of judged events, particularly including events such as diving, gymnastics, figure skating and ice dancing, in which the subjectivity of the scoring has long been a source of frustration to the athletes, coaches and judges.

BACKGROUND OF THE ART

One of the chronic frustrations in those sports that include subjective scoring is the lack of consistency from judge-to-judge for a given performance and in scoring variations from a single judge for a variety of competitors providing similar performances. Sports particularly subject to these judging vagaries include, for example, springboard and platform diving, gymnastics, figure skating and ice dancing. The disclosed systems and methods are intended to reduce and/or eliminate the effect of subjective judging on the outcome of the particular performance. As will be appreciated, the disclosed systems and methods may also be adapted for training purposes. For the purposes of this disclosure, springboard diving will be used as a representative sport in which the consistency of the scoring could be improved by implementing the systems and methods of the present invention.

Anyone observing an athletic competition, for example, a diving meet will observe that although several divers may appear to complete the same dive with a similar degree of success, it is likely that each of the competitors will complete the dive in a slightly different manner. This is because through their training, each diver will have developed unique mannerisms, characteristics of movement, strengths and timing—all of which contribute to an abstract concept commonly encompassed by the term "style."

Style is difficult to assess by any standard, except whether or not you like it. This is one reason why judging a subjective aspects of a dive remains a difficult assignment even for the most dedicated and impartial judges. Even though there are certain criteria of execution all divers must meet for each particular dive, the evaluation of how well the diver met the stated criteria remains a largely subjective process. Indeed, no matter how well a dive is performed, artistic likes and dislikes of the judges, the reputation of the individual diver(s) and/or the venue can play a large part in the outcome of any contest. Accordingly, it is a rare contest indeed in which there are not fundamental differences of opinion among coaches, competitors, judges and spectators about the absolute accuracy of results.

In general, a dive is scored between zero and 10 points (full or half point increments) by each judge. A table of the scores and how they should be awarded for the overall dive appears below:

| Total Points | Judge's Evaluation |
| --- | --- |
| 0 | completely failed |
| ½-2 | unsatisfactory |
| 2½-4½ | deficient |
| 5-6 | satisfactory |
| 6½-8 | good |
| 8½-10 | very good to exceptionally good |

The scoring for each dive is further apportioned between parts of the dive with between 0 and 2 points being awarded for the approach, between 0 and 6 points being awarded for the elevation and execution of the dive and between 0 and 2 points being awarded for the entry.

A number of discrete elements are typically found in each dive. A forward dive, for example, may be defined as: the approach, which should be smooth but forceful, showing good form; the takeoff, which must show control and balance; the elevation, the amount of lift the diver receives from the takeoff; execution, the completion of those technical elements that distinguish a particular dive; and the entry, both the angle of entry, which should be vertical, and the amount of splash, which should be minimal.

Additional rules address each of the elements. The approach, for example, should comprise no fewer than three walking steps followed by a jump from one foot (the hurdle) followed by a two-footed landing at the end of the board. The hurdle step is not included as one of the walking steps. A violation of these rules would constitute a "balk" which should result in a 2-point reduction from each judge's score. Violations would include:

Taking fewer than 3 walking steps;
Jumping from both feet; and/or
Landing on one foot.

The purpose of the approach and hurdle is to provide the diver with a technique for consistently getting to the end of the diving board and safely initiating the intended dive in which the hurdle transforms a portion of the linear momentum (walking motion) into a vertical motion (the jump) that will be used to deflect (or load) the board in order to launch the diver. The diver should be oriented so that the diver's shoulders are forward of the diver's center of gravity ("CoG") (or center of mass ("CoM")) so that the diver moves up and out away from the board, thereby reducing the chance of colliding with the diving board. The positioning of the diver leaving the board will define a parabolic arc traced by the diver's CoG from the board to the water.

Divers generally try to load the board with as much energy as possible, i.e., bend the diving board as much as possible. In order to do this effectively, the diver must stay balanced over the feet to apply maximum loading. As the diver's CoG is offset from a vertical position above the diver's feet, the amount of deflection that can be induced in the board will be reduced.

As the board reaches its greatest deflection, i.e., when the board is fully loaded, the diver must shift the CoG into a position for initiating the intended dive. In order to achieve the maximum possible rotation, the diver must initiate the rotation while the diver's feet are still in contact with the diving board, but in order to complete the dive safely, this shift must occur at some point between the time the board begins to unload its stored energy and the point at which the diver's feet leave the board. As a general rule, lower rates of rotation will typically be initiated later in the dive, i.e., closer to the point at which the diver's feet leave the board while for higher rates of rotation will typically be initiated much earlier in the dive.

It is generally agreed that the entry puts the finishing touch on a dive and it is obviously the last impression that is left with the judges. Entries can be nearly splashless or look like the result of an underwater explosion. Reducing the volume of the entry splash generally involves defining a parabolic arc for the dive that approaches vertical at the water surface. The degree to which a vertical entry is achieved does not, however, necessarily correlate to the volume of the resulting splash. The objective of the diver should be to achieve an entry in which the diver's entire body to pass through the same opening in the water that the initial contact of the hands (or feet) will create in the water surface.

If the arc of dive is still traveling forward at the point of entry and the diver still attempts to achieve a vertical body position, the dive will still go past vertical (long). If the diver is still moving away from the board upon entry the hands will create an initial opening in the water surface that will be elongated by the successive entry of the diver's arms, head, shoulders, hips, legs and feet. This elongation will cause water to splash forward and, as a result of the additional resistance on those parts of the body that have entered with water will induce additional rotation that will tend to shift the diver's body past vertical.

As will be appreciated by those skilled in the sport, this simplified discussion of the entry does not take into account the rotation inherent in the particular dive being attempted. Indeed, the diver's rotation will continue, albeit at a reduced rate, as the diver "kicks out" of the dive and adopts a body position that increases the diver's moment of inertia.

Once the path of the dive is established and the intermediate rotating and twisting elements have been completed, the diver can begin establishing proper body alignment for the entry. As noted above, in the ideal situation the diver's body should form a straight line from hands to toes paralleling the bottom and substantially vertical portion of the parabolic arc that was established as the diver left the board. If this body position is achieved, the entire body can pass through the same opening in the water. When properly executed, experienced divers can achieve substantially splashless (rip) entries from heights greater than 10 meters.

Squeezing the biceps against the ears reduces slack in the shoulders and increases the stability of the diver's head and neck upon entry. It is generally believed that most of the splash and some portion of diver injuries result from failing to maintain proper alignment of the head, arms and shoulders. The diver's body must be held firm and aligned through impact with the surface of the water to achieve the best entry. Collapsing at impact will tend to destroy the integrity of the dive and can cause serious injury to the diver. Once most of the diver's body has entered the water, the diver can initiate an underwater save to reduce the depth reached before the diver's downward motion is stopped—preferably well before reaching the bottom of the pool. It should be noted that a diver's underwater actions are not a judging criterion.

Diving meets must be scored by a minimum of three judges, but may be scored by a panel consisting of as many as nine judges. When more than three judges are used, the highest and the lowest scores awarded for a particular dive are dropped and the raw score is determined from the remaining scores. Because of the subjectivity involved in judging, it is generally advisable to use more than three judges to reduce the impact of any bias that one or more judges might have and thereby provide a more accurate score for the execution of a particular dive.

When judging a dive, the judges are supposed to base their score on the diver's execution of the five basic elements of the dive.

Starting Position: A dive is to be judged once the diver assumes the starting position on the springboard or platform. This may be standing facing the water for forward approaches, with the diver's back to the water at the end of the springboard or platform for backward approaches, or in preparation for a forward or backward handstand take-off on the platform. Depending on the dive, the diver should be standing straight with the head erect, and the arms straight and steady in a position of the diver's choice.

The Approach: The diver shall, on front approaches, move to the end of the springboard in a smooth motion showing good form. Using no less than three steps, the diver shall execute a forward hurdle from the last step. A hurdle is the jump to the end of the board and must be executed from one foot. The back approach is characterized by a series of arm swings used to initiate momentum. At no time during the back approach shall the diver's feet leave the springboard or platform. If the diver begins the approach from the starting position and stops, the diving referee will declare a balk and two points will be deducted from each judge's score. If the diver again starts the approach and stops, the dive will be considered failed and no points will be awarded.

The Take-Off: After completing the forward approach and hurdle, the take-off should show proper balance and control, and initiate a safe distance from the board. The diver must leave the springboard from both feet. On a platform take-off, the diver may leave the platform surface from one foot.

The Flight: The flight of the dive should be smooth and graceful and at no time should the dive move to the left or the right of the springboard or platform, or shall any part of the diver touch either the springboard or platform. During the dive, the body shall be carried in one of the four acceptable positions: tuck, pike, straight, or free.

The Entry: The entry into the water, whether it is a head-first or feet-first entry, shall be vertical or as close to vertical as possible. The diver's body shall be straight, the legs together, and the toes pointed. The arms must be extended over the head and in-line with body on head-first entries. On feet-first entries the arms shall be straight and at the diver's side.

As noted above, and evident to even casual spectators, judging athletic competition, whether diving, gymnastics, ice dancing, etc., is, by its very nature, a subjective endeavor. Accordingly, a given score represents the essentially personal opinion of the judge as to the relative merits of the competitor's efforts. It is also presumed that well informed judges, particularly those having extensive judging experience, will provide more consistent scoring, but even in these instances there have been dramatic differences between judges as to the relative merits of a particular performance. Some such differences may be explained, at least in part, by the slightly or, in some instances, very different vantage points from which the judges view the performance. This variation in vantage point may result in one or more judges completely missing a form break or other irregularity in a diver's execution of an intended dive. Similarly, particularly for dives with multiple somersaults and twists, it may simply be impossible for even the most well-intentioned and observant judge to miss certain elements of a particular dive and give a score based more on an overall perception rather than a rigorous application of the rules.

BRIEF SUMMARY

By using motion capture and analysis, the apparatus and methods of the invention can be used to limit or remove the subjectivity in the scoring of athletic events, particularly those with well defined rules as to the particular sequence of movements that define successful completion of a particular dive or element. The apparatus and methods can also be utilized for training purposes, allowing the athletes and coaches to review and compare a variety of attempts and thereby fine-tune the athletes' performance by identifying, with precision, those portions of the dive or element that warrant correction and the success of the athlete in achieving the desired correction.

BRIEF SUMMARY OF THE DRAWINGS

Example embodiments described below will be more clearly understood when the detailed description is considered in conjunction with the accompanying drawings, in which.

Figure 1:
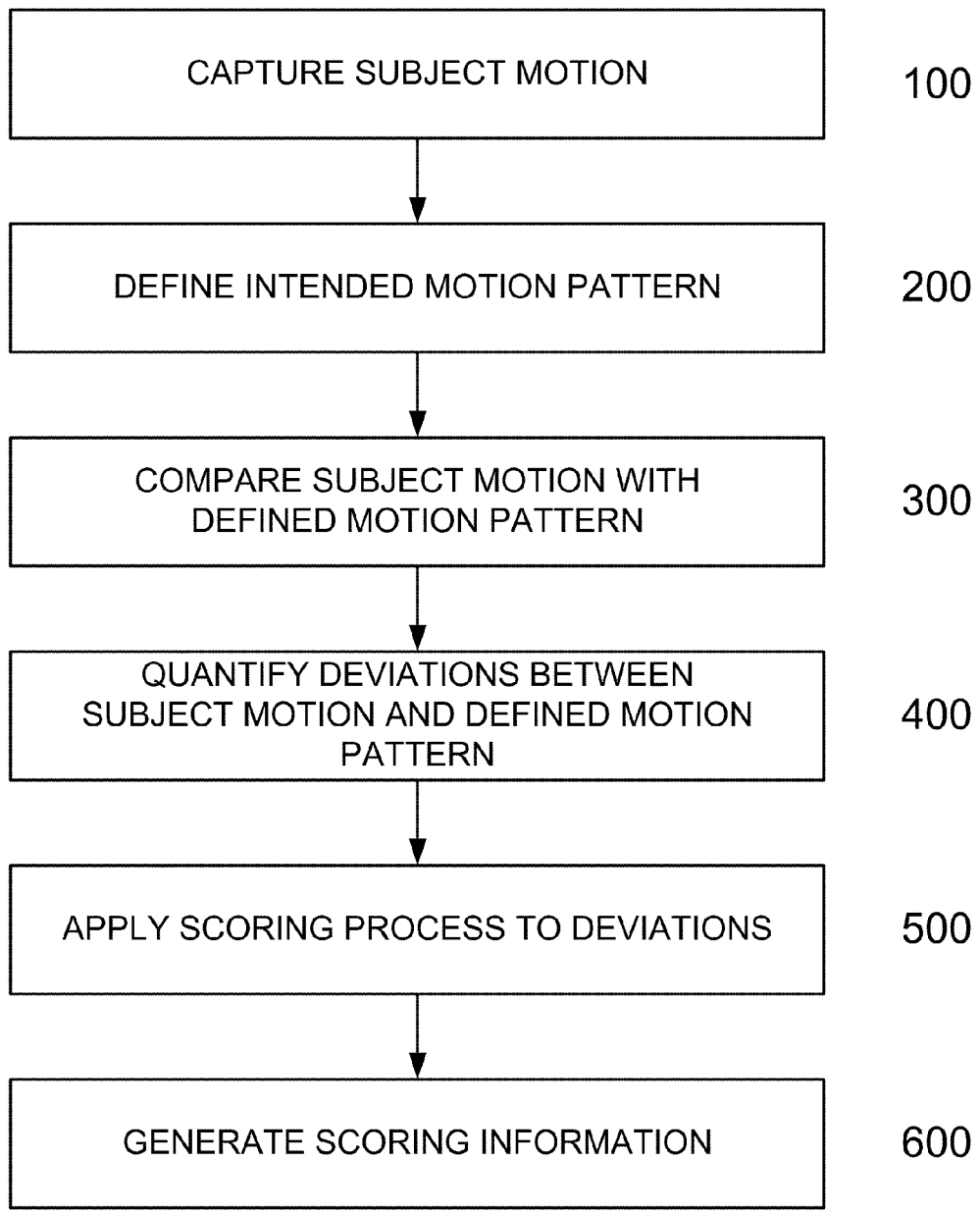
FIG. 1 illustrates an example embodiment of a method for according to the disclosure.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

A variety of motion capture systems are available on the market for data acquisition. The processes and methods used for converting the collected data into a usable animated human model are generally carried out independently from the basic data acquisition. Numerous solutions have been proposed for providing an integrated system of data acquisition and processing, these solutions have, however, achieved varying levels of success.

Motion capture may be defined as the process of recording live motion and translating it into usable mathematical terms by tracking a number of reference points through space over a period of time and combining this tracking data to obtain a 3D representation of the motion. For the purposes of this disclosure, a "3D representation of the motion" means a three dimensional representation of the captured subject motion whereby each image frame of the modeled motion reflects, with sufficient accuracy, the actual orientation of the subject throughout the original motion. "Mathematical terms" are the various motion parameters that are used to allow such 3D modeling of the motion of the human body through a full range of motion including, for example, the angles and relative rotation of each joint of the body. "Tracking" reflects the progression of body positions over a given period of time, e.g., the portion of a dive from the approach through the entry. More specifically, tracking requires the ability to locate and identify reference or "key" points on the tracked object, e.g., points corresponding to the hands, elbows, feet, knees, hips, pelvis, etc. of a diver, from frame to frame throughout the entire motion sequence. The key points can be defined in a number of ways depending on the particular motion capture technique involved, but in most cases will correspond to specific landmarks on the human body (limb extremities, body contours, markers, etc.).

A first type of mechanical motion capture involves the use of "exo-skeletons," i.e., a suit or assembly composed of a group of metallic structures linked by accelerometers or other sensors located at the major joints. The exo-skeleton is, in turn, connected to an interface that allows for directly retrieving the positional and rotational data from each of the sensors.

Such systems have obvious drawbacks in that the exo-skeletons can be expensive, cumbersome and tend to restrict natural motion by its mere presence and exert non-negligible forces on the athlete's joints. Despite these drawbacks, exo-skeleton assemblies have the advantage of yielding immediate joint angle values within a capture space without any intermediate processing to calculate such data and improving their utility for real-time motion capture systems.

Another type of motion capture involved the use of electro-magnetic suits that consist of an array of magnetic receivers placed on the joints of the subject, with each receiver being linked to a computer. The magnetic receivers, in combination with a nearby magnetic transmitter, allows for the measurement of the spatial relationship of the sensors within the array. As with the exo-skeleton systems, however, the electro-magnetic suits tended to be cumbersome and, without the use of wireless transmission, included a high risk of entanglement in the cables necessary to transmit the spatial data to the computer. Wireless or not, the electro-mechanical systems are subject to interference from any external magnetic fields or metallic objects, a sensitivity that further limits the range of use and/or the quality of the data obtained. Further, as will be appreciate by those skilled in the art, unlike the exo-skeleton systems, in electro-mechanical systems the rotational values of the joints are not retrieved directly and must, therefore, be computed from the relative positions of the corresponding sensors.

Acoustic systems provide another type of motion capture in which high-frequency sound waves are used to determine the position of objects. Audio transmitters placed on the key points of the subjects and transmit a designated frequency at a regular interval with the relative position of each transmitter being computed by estimating the distance between the transmitter and an array of audio receivers arranged around the subject. The distances between the transmitter and several audio receivers are then triangulated and thereby infer the position of the transmitter in 3D space.

One advantage of such systems is the relatively lower cost, but in order for the triangulation to be effective each of the transmitters must be within the line of transmission to at least three audio receivers at all times in order for a 3D position to be accurately determined. Complicated movements, therefore, tend to result in the loss of positional data from the transmitters for various periods of time. Furthermore, in some embodiments of the acoustical systems, the data for all transmitters cannot be computed at the same time, a limitation that forces the subject to remain in each position until the last transmitter has transmitted its signal in order for the position to be fully and accurately captured. As will be appreciated, such embodiments are not suitable for capturing rapid or even moderate motion, rendering them generally unsuitable for athletic motion capture.

In some aspects, optical motion capture systems function much like the acoustic systems, except that these systems use light rather than sound for detecting sensor positions within the field. An example of such a system utilizes a number of calibrated cameras that are arranged around a field within which or through which the subject will be moving (typically six to eight cameras are used to provide reasonably complete motion capture). The subject is then outfitted with reflective markers, for example, a body suit with a pattern of markers affixed, at key points that can be tracked through 3D space by the cameras. Given the position of the markers in each camera view, the position of the sensors in 3D space can then be computed using stereo triangulation. As with the acoustic systems, each reference point should be in view of at least three cameras in order to reliably determine the 3D position of the reference point. Although, in theory, two cameras would be sufficient, in practice the use of only two cameras can result in depth ambiguity issues that compromise the accurate determination of the position. Such systems are advantageous in that the marker configuration is totally flexible, as is the number of markers that can be used. Reflective markers are typically not perceived as cumbersome by the subject and, therefore, do not tend to constrain or modify the subject's execution of the intended motion(s) to any significant degree.

The size of the capture area is a function of the focal length of the cameras utilized and can, therefore, be extended or reduced relatively easily. Such systems also provide for a relatively high sampling rate is very high, thereby allowing for the capture of fast and complex motion. The drawbacks of such optical systems are similar to those of the acoustic systems in the sense that in order for the position of a marker to be determined accurately, the marker needs to be visible to at least three cameras. And, as with the acoustical systems, the need for post-processing remains very high in order to compute the joint angle values from the collected 3D marker position data.

One additional drawback to such systems is the initial anonymity of the various markers that must then be identified to allow for the necessary positioning data to be complied and, consequently, for the movement data to be modeled accurately. Accordingly, most motion capture systems are used with some form of tracking software package with which each marker may be manually identified in an initial frame or frames and then tracked throughout the captured motion sequence. Although such manual marker identification can reduce the need for additional computing resources, the need for each tracked sequence to be visualized and labeled by an operator slows the process and can introduce identification errors that will compromise the resulting positioning data.

There is increasing interest in motion capture from video, due in part to its reduced requirements in terms of the hardware required and its applicability to a wide range of activities. Video motion capture systems would reduce or eliminate the need for specialized markers and/or sensors as well as overcoming the various system-related constraints inherent in the use of the marker and/or sensor dependent systems.

When it comes to recovering 3D positioning and movement data, video motion capture methods tend to use a predefined model for representing the human body with more or less precision. In some cases, the human body representation or model is derived directly from the segmented 3D data, such as those that make use of volumetric data by transforming a set of 3D points corresponding to the body's volume into a pose-invariant intrinsic space posture using an isomap transform, extracting the principle curves and then back-projecting these curves into Euclidean space to produce a corresponding skeleton posture. Another and less complex method extracts representative human body points from the captured silhouettes from three cameras with the skeleton joint positions and joint rotations being derived using genetic algorithms as applied to historical or generated data.

In general, however, when it comes to recovering accurate body positioning, the use of a human body model present certain advantages by allowing positioning data to be recovered from the collected data using inverse kinematics-like techniques with the corresponding joint parameters following immediately from this optimization step. Further, a human body model can be used to provide knowledge of and a reasonable range for the kinematic functioning of the body and its shape properties that can be used as a basis for pruning the solution space or resolving conflicts in instances of occlusion and/or collision. Position recovery using a human body model can also be referred to as "analysis-by-synthesis" in which the model is used to predict the positioning, or a limited range of positioning, that can be anticipated in the next video frame with the features of the synthetic model in the predicted positioning being matched to the collected data in order to determine the correct positioning.

The 3D model may then be used to predict positioning space, and by projecting it onto the image, provide a means for defining of regions where body's extremities are expected to be located. By segmenting the various body parts, the system can then determine the joint positions and angular values by simulating motion of the synthetic model until a "best-guess" positioning solution is found. For improved accuracy, the motion of each body part may be assessed on the basis of several image views taken from different perspectives. The generated model may then be modified as necessary to align the various body parts of the customized model in order to achieve good alignment with a body silhouette extracted from the captured video by using, for example, a Kalman-filter based estimator to predict model parameters.

Inverse kinematics-like techniques include, for example, using positioning methods commonly employed in robotics in which the various joints in a robotic structure, or in this instance, a mathematical model, are modified until a goal position is achieved and using inverse kinematics to determine the joint angles necessary to reach the goal position. For the purpose of position recovery from image data, a parameterized human body model ("HBM") may be configured as a hierarchical structure with each link having the rotational properties that correspond more or less to the real-life situation. These extracted features are then used as the goal to be achieved with inverse kinematics techniques being used to determine the best positional fit. As will be appreciated by those skilled in the art, a number of mathematical techniques, models and approaches may be utilized, either singly or in combination, in such analyses including, for example, gradient-descent optimization methods, Kalman filtering, differential motion estimation, user-tuned human body model, iterative closest point ("ICP") optimization, edge detection, color matching and/or non-linear optimization, typically performed independently for each body part in order to avoid local minima.

Other methods rely on synthesizing HBM positions and defining position recovery as a search for the joint parameters of the model that best correspond to the extracted image features. For example, using a multi-view framework, the HBM may be used for positioning prediction to which the captured image contours of each body part are matched to obtain a "best-fit" solution for each image. This matching of the HBM and the captured image(s) can be applied in both interactive and automatic modes, but both methods will typically include a gradient descent analysis to find the optimal solution within the set of proposed synthesized HBM positions postures for each frame.

Probabilistic techniques for determining the best matching position can also be used for matching the HBM to the corresponding contours in a single image using, for example, an Expectation-Maximization (EM) algorithm in which the E-step predicts the positioning of the model and the M-step verifies the prediction and updates the probability distribution according to the observed correspondence between the captured image(s) and the HBM features. In some instances, hybrid Monte Carlo filtering has been used for estimating the positions of the HBM corresponding to the captured image sequence with marker positions representing joint locations as matching features.

Various methods have been tried for recovering positioning using precise measurement equations, relying on the segmentation of images and detection of landmark features for directly inferring the entire set of model parameters. In some instances, a series of transition graphs are constructed for recognizing a limited set of motion types with each motion type defining constraints that allow for the motion parameters to be inferred on the basis of body part regions recovered from the image sequence. Certain detected features, for example, hands, feet, ears, mouth and/or eyes, can provide an initial basis for determining a range of possible positions by applying various parameter equations.

Historical data may be used to construct and/or refine a HBM useful for estimating positioning from recovered silhouettes even in a single view set-up, but additional equations reflecting the various joint parameters of the human body can be used in combination with key points to obtain rotational values as well. Applying such motion constraints between individual body parts can then be used to match a HBM to silhouettes captured from multiple camera views.

Another category of position recovery methods are those that rely on learned motion, in which the HBM positioning may be estimated by clustering and coding the learned position states with a Minimum Length Descriptor to retrieve the best fit, based on image color, texture and/or boundary matching.

As suggested above, a motion capture process typically starts by selecting a HBM against which the captured images will be analyzed. The HBM allows the synthesis of positions that are subsequently compared to the corresponding data features. The result of these comparisons will indicate the degree of progress toward a solution and, ideally, will provide some indication of the direction of the modifications to the model necessary to improve the correspondence between the HBM and the captured image(s). The HBM should be designed to represent the space of all possible solutions and, therefore, should be capable of synthesizing positions based on the observed data features and incorporate its own defining features that can be related to the features extracted from the image data. As effective positioning recovery analysis should be capable of substantially contemporaneous execution, better HBM are those that do not incorporate an excessive number of parameters that would cause needless and time-consuming computation in order to obtain a result of sufficient accuracy.

When defining a human body model for motion capture purposes, a number of criteria should be kept in mind including:
- the parameters defining the HBM's configuration should be sufficient to recover the desired range of positions with sufficient precision while not adding unnecessary complexity; and
- the elements defining the HBM should correspondence to those elements of the human body reflected in the range of positions captured in the image data without adding unnecessary elements that are not reflected in the positioning data.

As suggested above, the HBMs used for providing a priori motion knowledge to the motion capture process will vary in complexity depending on the application. A HBM typically includes a skeleton (or stick figure) representation, consisting of bones and joints, and may also include a shape layer defining the body outline. The complexity of a HBM is defined both by the number of model layers and by the intrinsic complexity of each layer itself.

The skeleton is generally represented by segments linked by nodes that have one, two or three rotational degrees of freedom (DOFs), depending on the joint. The segments representing the bones can vary in length and may be expressed by a translation parameter. The thickness of the bones and joints is not generally taken into account, as this would unnecessarily complicate the model. The joints between the various segments can, in turn, be represented by any of the existing rotation format including, for example, Euler angles, axis-angles, exponential maps or quaternions.

Each joint in the skeleton will have a local coordinate system associated to it with the rotation at the joint being defined with respect to the three orthogonal axes. In general, one of the axes will be aligned with the segment whose orientation is determined by the joint rotation. In this general case, a 3D rotation can be defined in terms of angular and axial rotation, angular rotation defining the orientation of a segment in 3D space (e.g., swing), and axial rotation performing a rotation of the segment around its aligned axis (e.g., twist). In computer graphics models, it is typically the skeleton that drives the deformation of the soft tissues whereas, in reality, the reverse occurs. Indeed, in real life, it is the muscles that allow the motion of the skeleton.

The various joint types in the human body have been grouped into various classes including, for example, (a) hinge joints that perform rotation in one plane only; (b) pivot joints that allow only axial rotation, (c) ellipsoidal joints that rotate in two planes (no rotation around the axis itself); (d) saddle joints that allow rotation in two planes and a small amount of axial rotation; (e) spherical or "ball-and-socket" joints that rotate in three planes. The pure rotational joints, i.e., those not involving any bone translation are generally considered one DOF joints and include the hinge joints (one swing component, such as the ulno-humeral joint, i.e., flexion of the elbow) and pivot joints (twist component, such as the ulno-radial joint, i.e., twisting of the elbow). Two DOF joints include condyloid joints (one swing component and twist, such as the knee) or ellipsoidal (two swing components, such as the wrist) and three DOF joints include the saddle joints (as the thumb) and ball-and-socket (two swing components and twist, such as the shoulder and hip joints).

Representing 1 DOF or 2 DOF rotation presents no particular problem, and it can be expressed by an Euler angle around one or two axes. The axes around which no rotation is allowed are said to be "fixed." 3 DOF rotation can be represented either by quaternions, axis-angles, exponential maps or Euler angles, the problem being that the three latter formats each include singularities. Although these singularities can be avoided relatively easily in the case of the axis-angle or exponential map formats, using Euler angles remains problematic. Quaternions, on the other hand, avoid the problem of singularities but introduce the disadvantages of using four parameters to represent a 3D rotation that render the calculations more complex.

A wide range of image capture equipment, imaging, and processing techniques have been disclosed in previous patents including, for example, U.S. Pat. Nos. 5,930,379; 6,115,052; 6,269,172; 6,392,665; 6,554,706; 7,006,683; 7,239,718; 7,245,743; 7,257,237; 7,327,383; 7,358,972; 7,428,318 and 7,457,439, the contents of which are hereby incorporated, in their entirety, by reference.

As illustrated in FIG. 1, is anticipated that methods according to the invention will incorporate some basic steps including capturing a subject motion 100, defining an intended motion pattern 200, comparing the subject motion with the defined motion pattern 300, quantifying deviations between the motion patterns 400, applying a scoring method or algorithm to the analyzed motion 500 and generating scoring information 600. With respect to capturing the subject motion 100 a number of camera configurations may be utilized, however, it is anticipated that an array of at least five cameras would be helpful in obtaining sufficient image data from which the positioning information will be developed.

Figure 2:
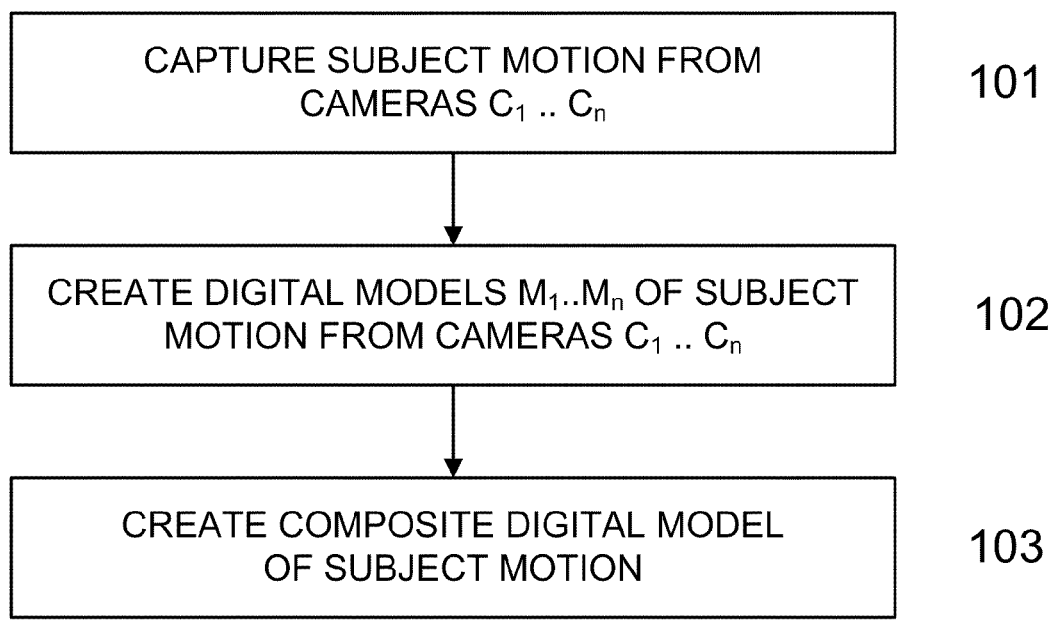
FIG. 2 illustrates an example embodiment of a method for executing a portion of the method illustrated in FIG. 1.

As reflected in FIG. 2, capturing the subject motion will typically include capturing subject motion from each of the cameras 101, performing an image analysis from the captured video frames to create positioning data or digital models corresponding to the motion observed from each camera perspective 102, and using this data or digital models to create a composite digital model, typically through a comparison with a human body model, that reflects the subject's motion as a series of frames through 3-D space with a desired level of accuracy. For example, in the interests of decreasing the computational time required to generate the model, positioning accuracy may be deemed acceptable within 3 cm for some applications while positioning accuracy on the order of 0.5 cm or less may be desirable or required in other applications in order to detect relatively minor variations in execution and/or form.

As will be appreciated by those skilled in the art, depending on the placement of the cameras and the particular dive being executed, portions of the diver's body may be shielded from the view of one or more of the cameras during some portion of the dive. Depending on the motion capture apparatus and protocol, the positioning of the shielded portions may be captured by other cameras and/or may be interpreted from the positioning of those portions of the diver's body that remain visible in order to construct a comprehensive HBM that includes the positioning of each tracked body portion throughout the entire dive sequence.

Figure 3:
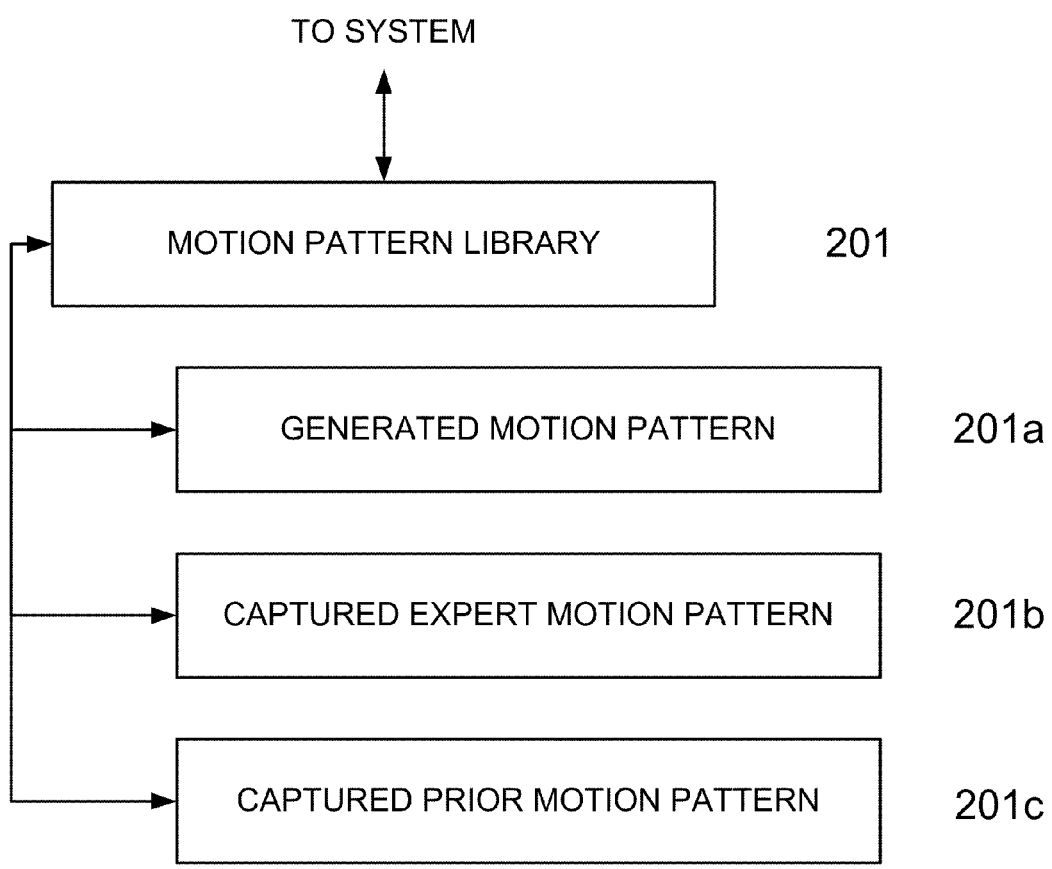
FIG. 3 illustrates an example embodiment of a method for executing a portion of the method illustrated in FIG. 1.

As reflected in FIG. 3, the motion patterns available from the motion pattern library 201 may include generated motion patterns 201a that, for example, are based on a dive selection as applied to a human body model in consideration of scoring criteria to reflect an ideal dive. For example, if the competitor's dive sheet indicates that the dive will be a forward 1½ somersault in the pike position, the system will generate an "ideal" version of this dive using the HBM, which may be applied with or without competitor-specific adjustments. Other patterns 201b may, for example, be obtained by motion capture data reflecting the past performance(s) of expert divers, e.g., Olympic gold medalists or a composite of such divers and/or dives. Yet other patterns 201c can comprise motion capture data reflecting, for example, the most recent dive, the subject's personal best dive and/or rolling composite or average of the last N dives previously performed by the current subject. As will be appreciated by those skilled in the art, those motion patterns based on the previous performances of both the current subject and/or other particularly skilled individuals can be very useful for training purposes in analyzing both the consistency of the performances and the effectiveness of corrective efforts.

Figure 4:
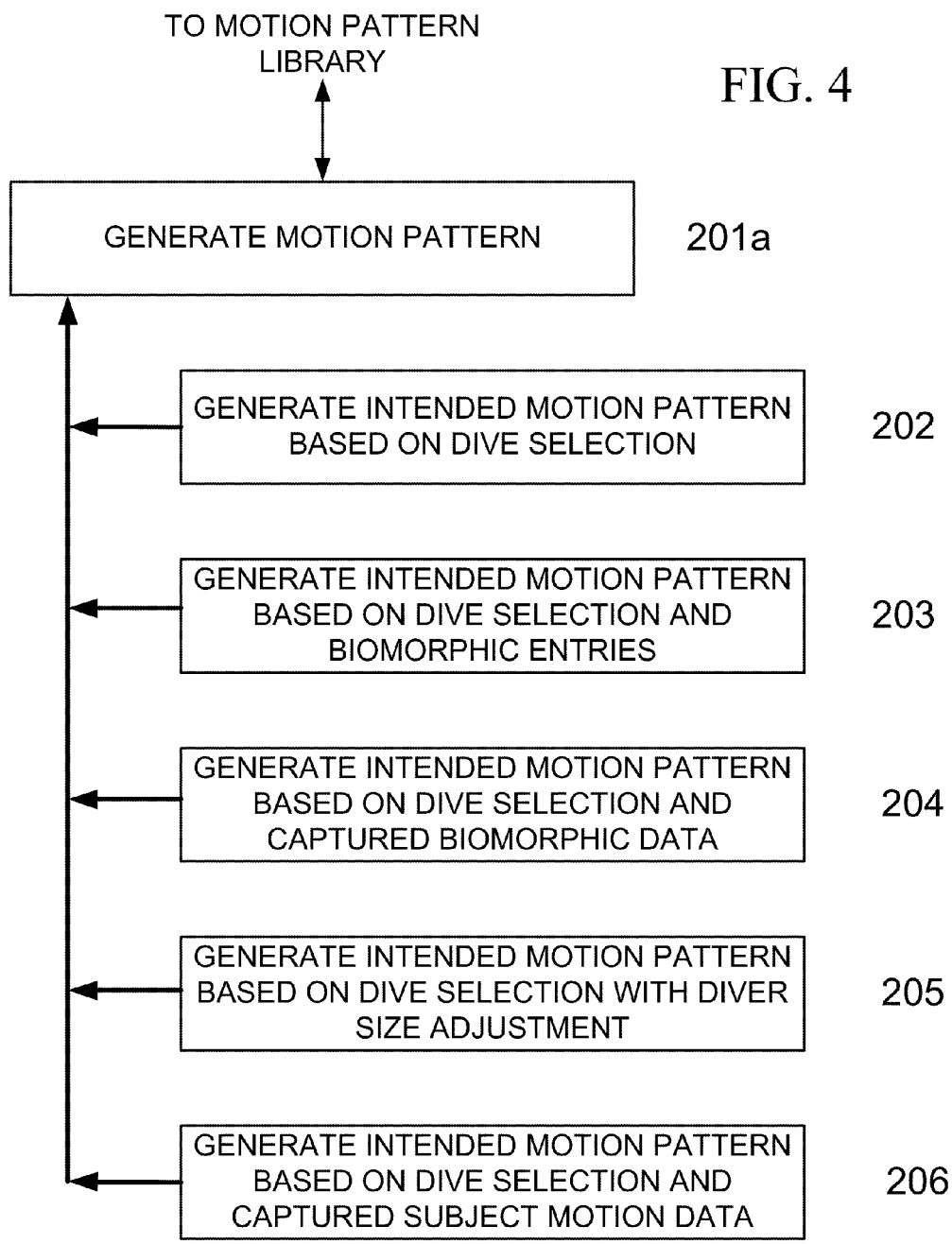
FIG. 4 illustrates an example embodiment of a method for executing a portion of the method illustrated in FIG. 3.

As reflected in FIG. 4, the generated motion patterns of FIG. 3 may be obtained by different methods including, for example, generating an intended motion pattern based on dive selection as applied to a somewhat generic human body model 202. Improved accuracy may be obtained, however, by generating an intended motion pattern based on dive selection as applied to the human body model that has been modified to some degree to reflect the actual biomorphic data of the subject including, for example, height, shoulder width, hip width, upper arm length, forearm length, etc. Such biomorphic data may be provided 203, for example, by the subject as entries on the dive sheet or, alternatively, as captured from the subject 204 at the event using a series of standard poses that can be captured by, for example, the system cameras, a subset of the system cameras or dedicated cameras in combination with designated background, i.e., a "green screen" or a grid screen against which the subject is imaged.

As also reflected in FIG. 4, somewhat more generic adjustment to the human body model could be based on established diver size ranges, e.g., small, medium or large builds, 205 or by generating an intended motion pattern based on dive selection as applied to the human body model that has been modified based on previously captured motion data 206 that can provide, for example, a better estimate of the forward travel distance that can be expected from a particular diver executing a particular dive or, alternatively, a composite of a number of divers performing a particular dive. As will be appreciated by those skilled in the art, the particular method used for generating the intended motion pattern will tend to produce models that exhibit different degrees of accuracy when applied to a particular subject.

Figure 5:
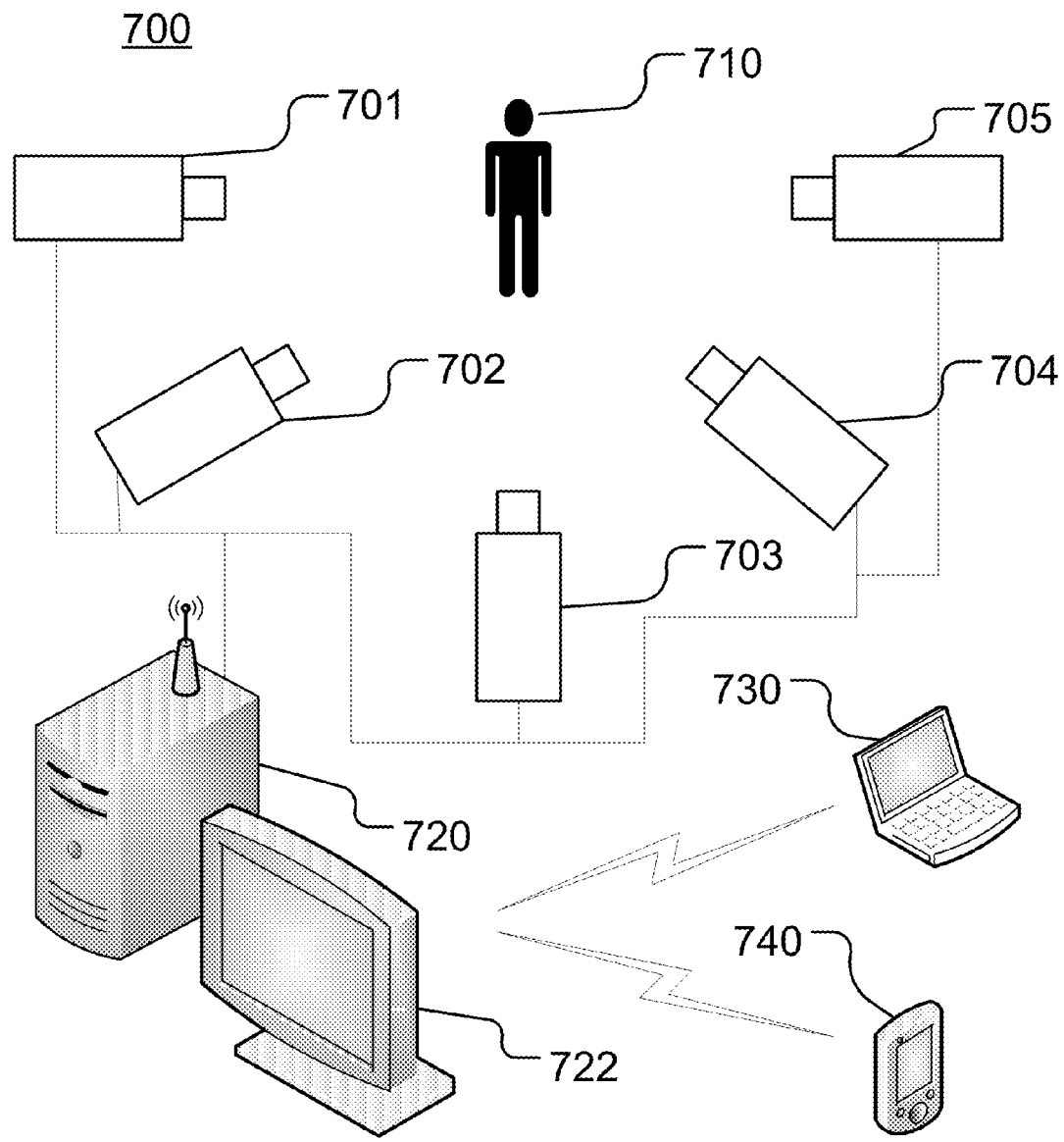
FIG. 5 illustrates an example embodiment of a system for executing a method according to FIG. 1.

As illustrated in FIG. 5, it is anticipated that systems 700 configured to practice the methods disclosed herein will include a camera array having a plurality of cameras 701-705 configured to capture the motion of a subject 710 through a defined 3-D space. This camera array will, in turn, transmit image data to a data collection/processing unit, for example, a computer or computer network 720, which will analyze the image data to produce a composite model of the subject's motion and compare that model motion to the intended motion pattern. It is anticipated that in most instances some deviations will be detected between the model motion and the intended motion pattern. These deviations, for example, form breaks, over-rotation and/or under rotation, will then be utilized as inputs into a scoring method or algorithm that, depending on the number and severity of the deviations, will calculate deductions from the maximum score to obtain an actual score. This scoring information will then be made available to interested and/or qualified individuals by, for example, displaying the score on one or more monitors 722, a large public scoreboard and/or transmitting the scoring information and related data to authorized laptops 730, cell phones and/or PDAs 740. Alternatively, the deviation information and/or associated images may be provided to event judges who may accept or reject noted deviations and/or make further stylistic adjustments to the subject's score before the score becomes official, thereby improving the transparency and/or providing for review and contemporaneous challenges of the scoring process.

Figure 6A:
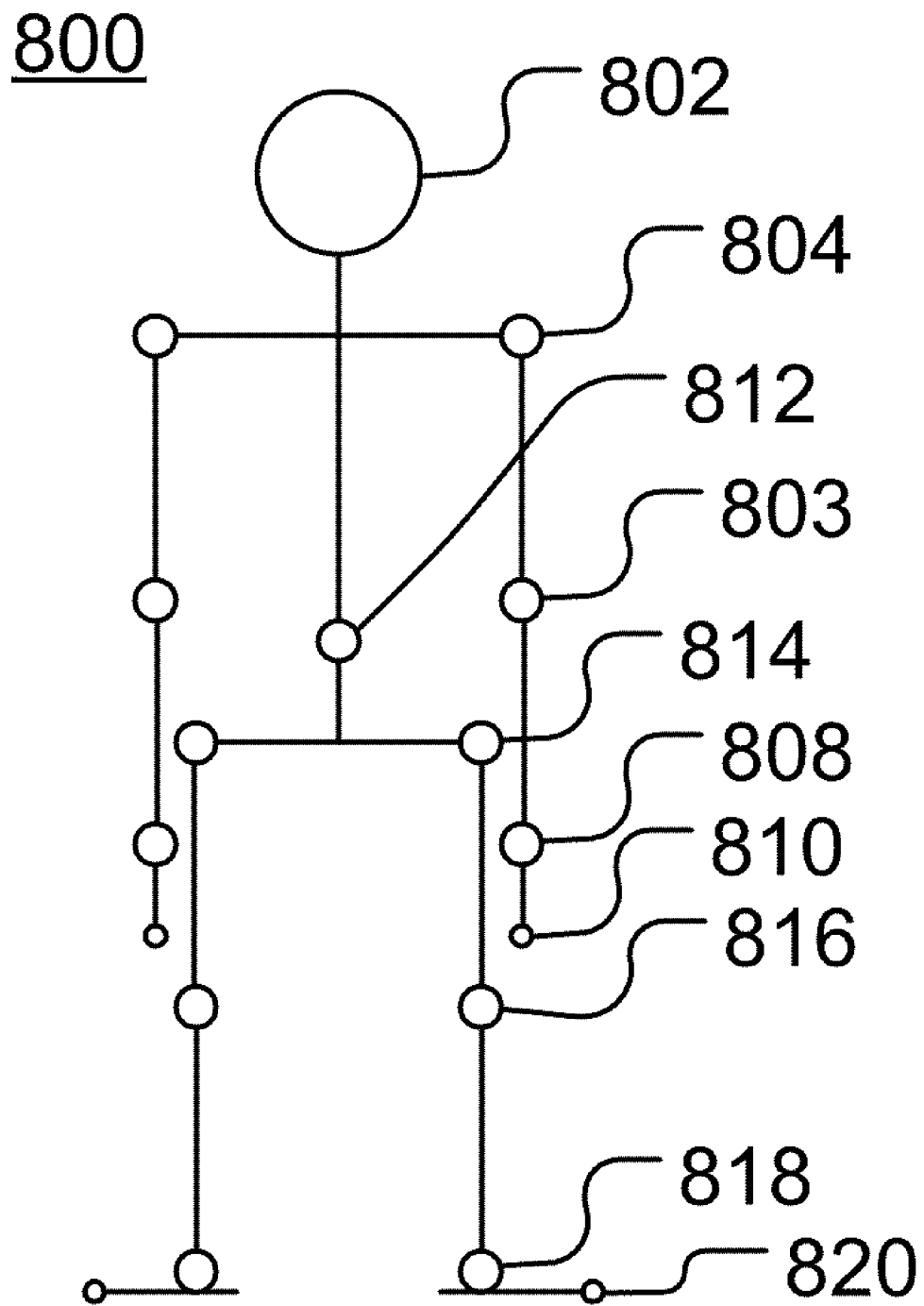
FIGS. 6A-C illustrate example embodiments of a method for modeling a competitor's body positioning using a "skeletal" frame.
Figure 6B:
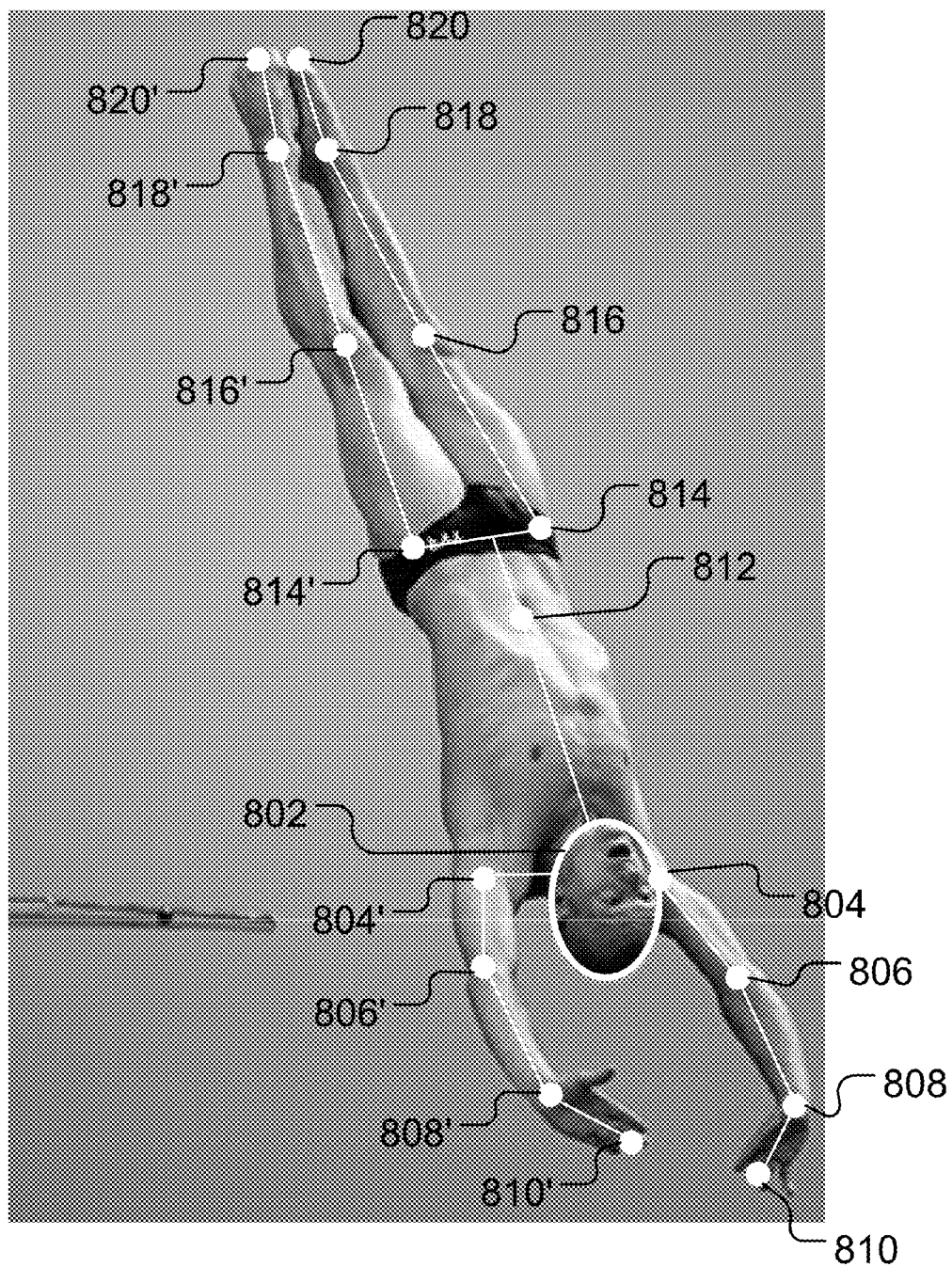
Figure 6C:
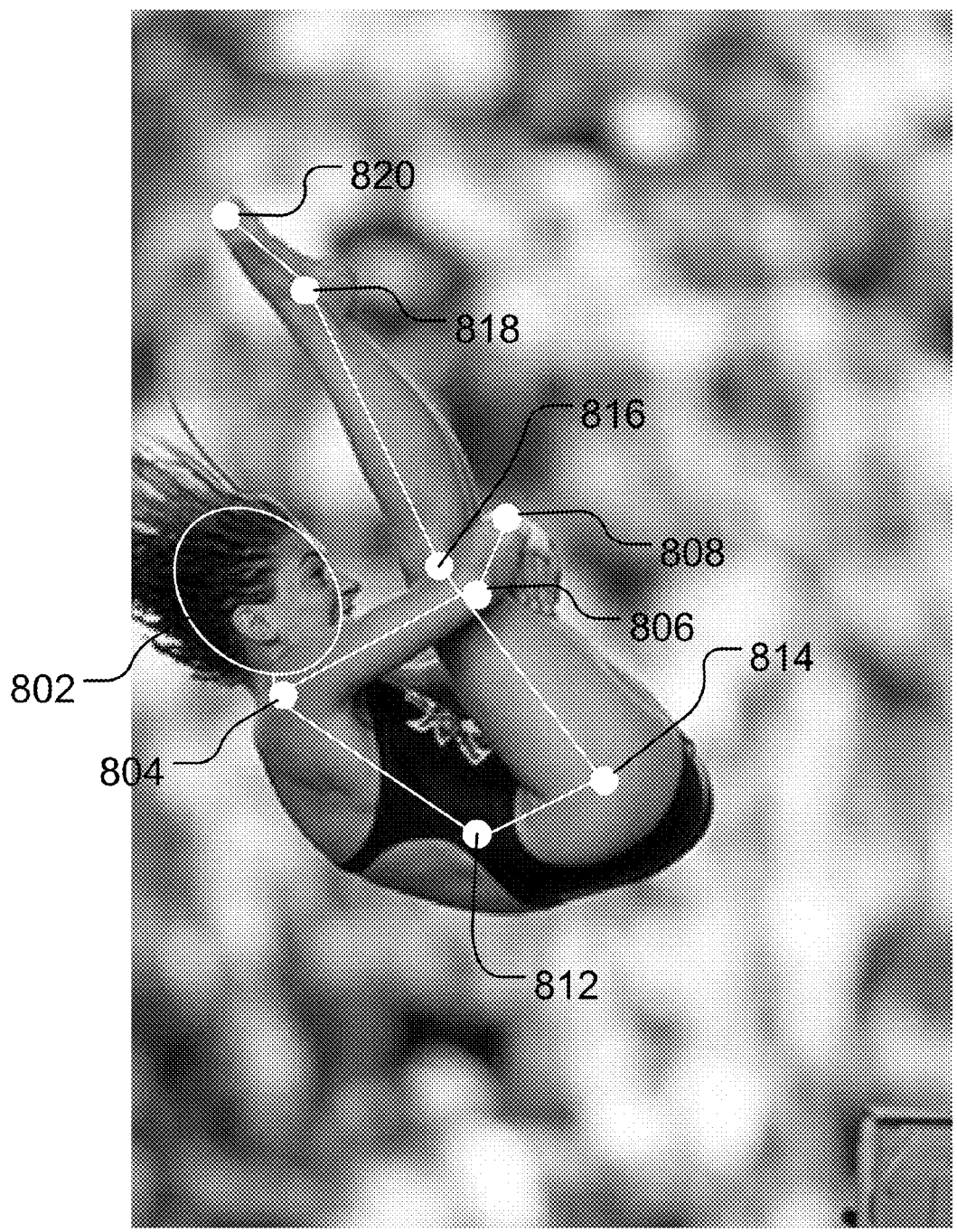

As illustrated in FIG. 6A, a basic human body model 800 for diving competitions will typically include elements corresponding to the head 802, shoulders 804, elbows 806, wrists 808, hands 810, waist 812, hips 814, knees 816, ankles 818 and feet 820. As will be appreciated, depending on the particular event, additional points of reference relating to the subject's body and/or associated equipment may be added or deleted as needed. As illustrated in FIGS. 6B and 6C, the basic human body model can then be superimposed on the captured video frame and adjusted as described above to provide an accurate representation of the diver's positioning in that frame.

As will be appreciated, the relative positioning of the corresponding left 804'-820' and right 804-820 portions of the diver's body, will reflect the precision of the positioning achieved by the diver, e.g., the alignment of the hips, knees, feet and toes may be analyzed for form breaks and provide quantification of both the severity and duration of the detected form breaks for use in scoring the dive. For example, if a dive is to be performed in a pike position, deviations in the alignment of the hips, knees and ankles corresponding to a bend at the knees of more than some predetermined value of, for example, 10°, would result in a deduction of 0.5 from the dive score. Similar analysis could be applied to identify instances of over-rotation, under-rotation, crossed ankles or other asymmetrical positioning of the limbs and/or other deviations from the proper execution of the intended dive that would merit deductions from the dive score.

Figure 7A:
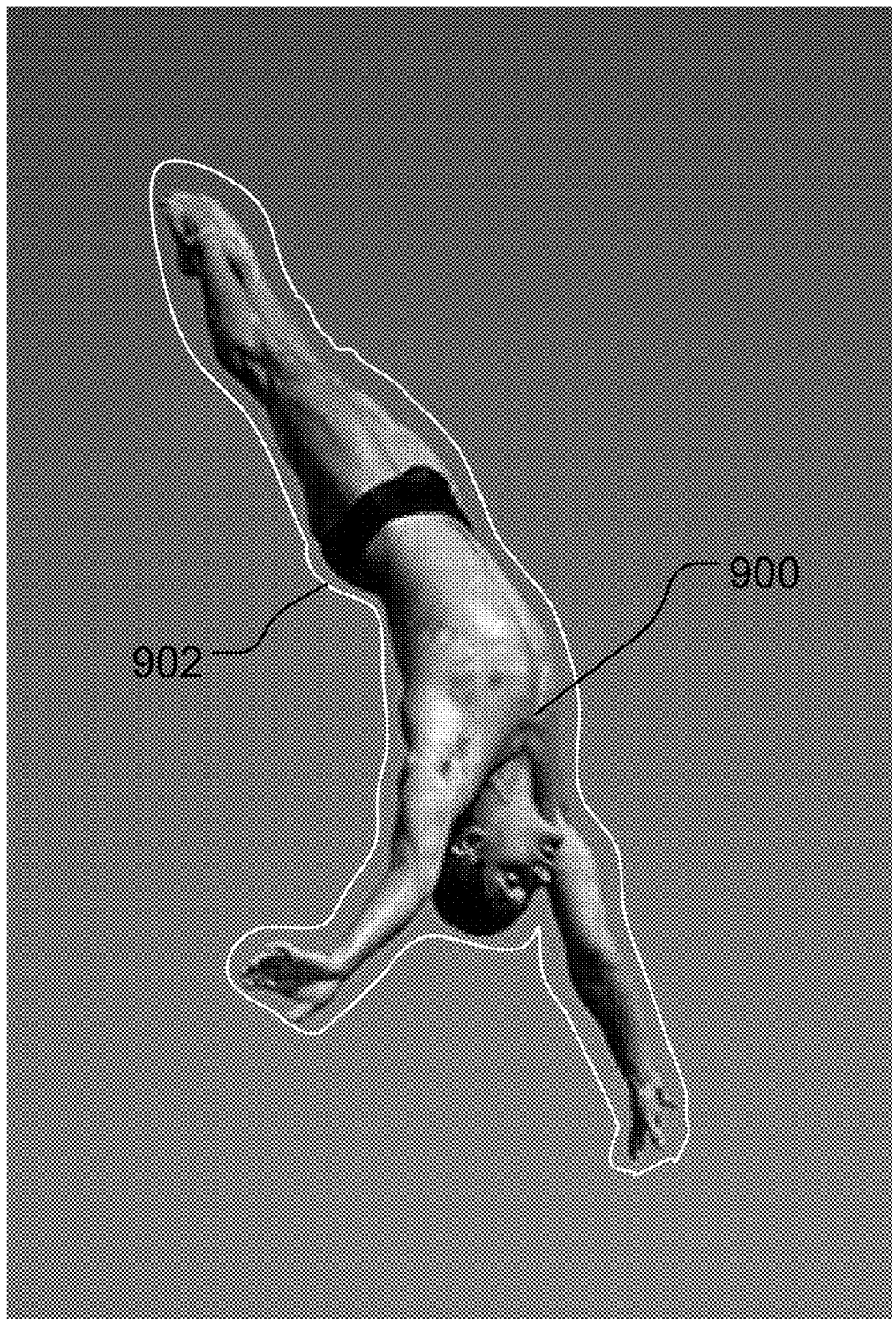
FIGS. 7A-B illustrate example embodiments of a method for modeling a competitor's body positioning using a "outline" frame.
Figure 7B:
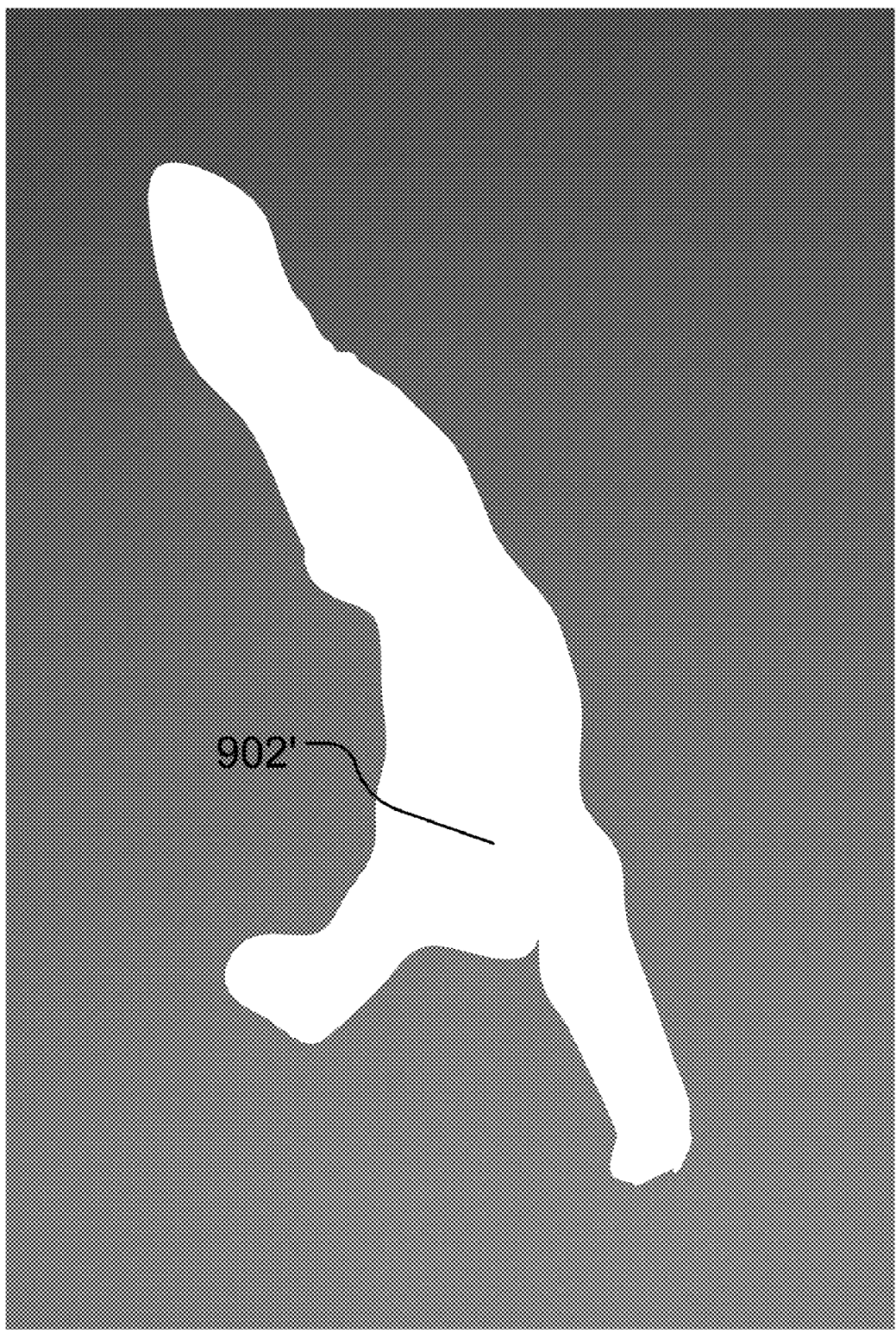
Figure 8:
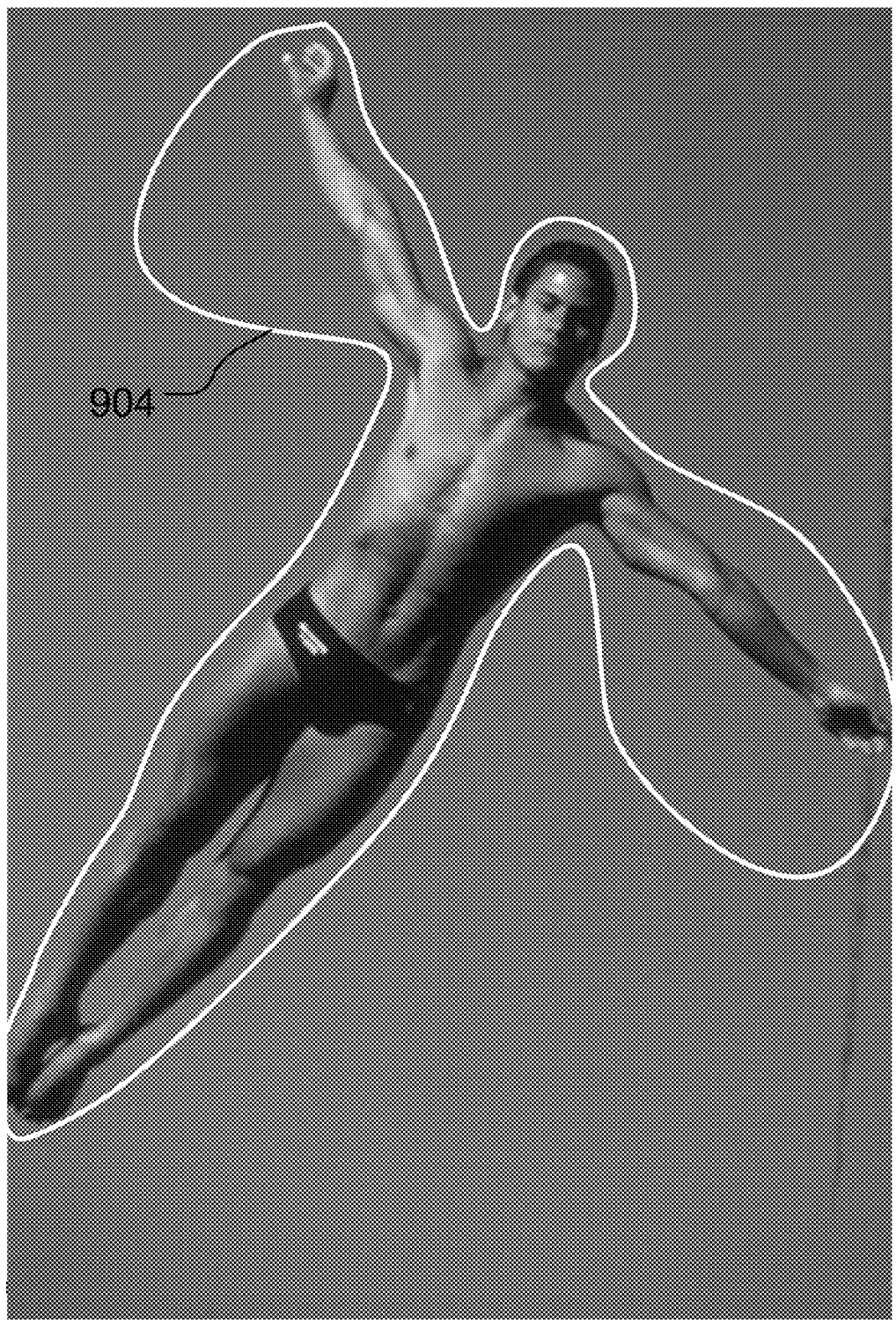
FIG. 8 illustrates an example embodiment of a method for modeling a competitor's body positioning using a modified "outline" frame encompassing a range of acceptable positioning.

As illustrated in FIG. 7A, the human body model may be expanded to provide an outline or silhouette format 902 that more closely conforms to the diver's body outline 900. As reflected in FIG. 7B, when the outline 902' is synchronized with and applied to a properly executed dive, no portion of the diver will be visible beyond the boundary of the outline. As illustrated in FIG. 8, for those instances in which a range of positions are deemed acceptable, e.g., the diver's arms can be held within a defined range of angles, a modified outline 904 can be utilized to incorporate this flexibility in the positioning and thereby avoid unwarranted deductions from the diver's score. Although single frames are illustrated for purposes of the discussion herein, as will be appreciated by those skilled in the art, the motion capture for each dive will include a sequence of such frames encompassing the period from the diver's initial approach through the entry. As will also be appreciated, increased frame rates will tend to provide more accurate results, but it is anticipated that the benefits of increased frame rate will be quickly offset by the need for additional computation. Accordingly, it is expected that a frame rate of between about 20 frames per second and about 50 frames per second will provide satisfactory results while keeping the computational load reasonable although higher frame rates will tend to improve the precision of the resulting HBM.

Figure 9:
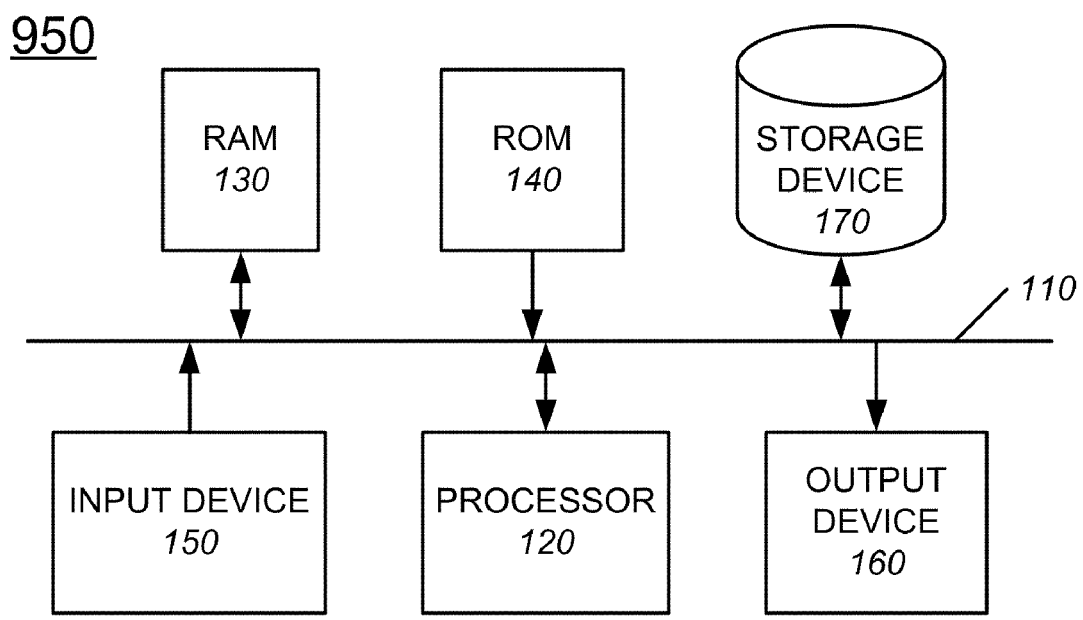
FIG. 9 illustrates a processor that can be utilized in implementing the disclosed system.

FIG. 9 is a functional block diagram of an exemplary processing device 950, which may be used to implement embodiments of a processing device consistent with the subject matter of this disclosure. Processing device 950 may be a desktop personal computer (PC), a notebook or laptop PC, or other type of processing device. Processing device 100 may include a bus 110, a processor 120, a random access memory (RAM) 130, a read only memory (ROM) 140, an input device 150, an output device 160, and a storage device 170. Bus 110 may permit communication among components of processing device 100.

Processor 120 may include one or more conventional processors that interpret and execute instructions. A memory may include RAM 130, ROM 140, or another type of dynamic or static storage device that stores information and instructions for execution by processor 120. RAM 130, or another type of dynamic storage device, may store instructions as well as temporary variables or other intermediate information used during execution of instructions by processor 120. ROM 140, or another type of static storage device, may store static information and instructions for processor 120.

Input device 150 may include a keyboard, a pointing device, an electronic pen, a touchscreen, or other device for providing input. Output device 160 may include a display, a printer, or other device for outputting information. Processing device 100 may perform functions in response to processor 120 executing sequences of instructions contained in a tangible machine-readable medium, such as, for example, RAM 130, ROM 140 or other medium. Such instructions may be read into RAM 130 from another machine-readable medium or from a separate device via a communication interface (not shown).

As will be appreciated by those skilled in the art, a variety of motion capture techniques, equipment, algorithms and modeling analyses may be successfully utilized in practicing the disclosed invention. The selection of one or more particular competitions may be determined by the environment in which the system will be utilized, the budget of the individual(s) or organization(s) that will be utilizing the system and the degree of accuracy desired. In most instances, particularly for the judging of athletic events, it is expected that the preferred systems will rely on video motion capture, provide for substantially contemporaneous processing and results and will be relatively robust in order to tolerate repeated assembly/disassembly, corrosive environments and temperature extremes.

I claim:

1. A method of evaluating a diver's performance comprising:
receiving a sequence of images as the diver moves through a defined space;
processing, by a processing device, the sequence of images to generate a performance model corresponding to the movement of the diver through the defined space;
comparing, by the processing device, the performance model with a comparison model;
identifying, by the processing device, deviation between the performance model and the comparison model;
applying, by the processing device, a scoring method to the identified deviation to obtain a score reflecting the diver's performance on a scale of from 0 to 10;
and outputting, by the processing device, the score in a human or machine readable format.

2. The method of evaluating a diver's performance according to claim 1, further comprising:
applying, by the processing device, a first adjustment method for improving a correlation between the performance model and the diver's performance.

3. The method of evaluating a diver's performance according to claim 2, wherein:
utilizing diver-specific biomorphic data in the first adjustment method for modifying the performance model.

4. The method of evaluating a diver's performance according to claim 3, further comprising:
collecting the diver-specific biomorphic data at a time generally contemporaneous with the performance.

5. The method of evaluating a diver's performance according to claim 2, further comprising:
applying, by the processing device, a second adjustment method for improving a correlation between the performance model and the comparison model.

6. A system for evaluating a diver's performance comprising:
a camera array arranged and configured for capturing a plurality of image sequences of the diver in a defined space;
a processor arranged and configured for converting the captured images sequences into a performance model corresponding to the diver's motion through the defined space;
identifying a deviation between the performance model and a comparison model;
and assigning a deviation value to the deviation;
applying a scoring method to the deviation value to generate scoring data on a scale of 0 to 10.

7. The system for evaluating a diver's performance according to claim 6, wherein:
the processor is arranged and configured for executing a first adjustment method for improving a correlation between the performance model and the diver's performance.

8. The system for evaluating a diver's performance according to claim 7, wherein:
the adjustment method utilizes diver-specific biomorphic data to modify the performance model.

9. The system for evaluating a diver's performance according to claim 8, wherein:
the camera array collects diver-specific biomorphic data at a time generally contemporaneous with the performance.

10. The system for evaluating a diver's performance according to claim 7, wherein:
the processor is arranged and configured for executing a second adjustment method for improving a correlation between the performance model and the comparison model.

* * * * *